(12) United States Patent
Kim

(10) Patent No.: US 11,492,045 B2
(45) Date of Patent: Nov. 8, 2022

(54) CONNECTING STRUCTURE OF ELECTRIC VEHICLE

(71) Applicants: Hyundai Motor Company, Seoul (KR); Kia Motors Corporation, Seoul (KR)

(72) Inventor: Hyunbin Kim, Incheon (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 107 days.

(21) Appl. No.: 17/183,608

(22) Filed: Feb. 24, 2021

(65) Prior Publication Data

US 2022/0185379 A1    Jun. 16, 2022

(30) Foreign Application Priority Data

Dec. 16, 2020  (KR) .................. 10-2020-0176167

(51) Int. Cl.
| | |
|---|---|
| *B60J 7/00* | (2006.01) |
| *B62D 21/15* | (2006.01) |
| *B60K 1/04* | (2019.01) |

(52) U.S. Cl.
CPC .............. *B62D 21/157* (2013.01); *B60K 1/04* (2013.01); *B60K 2001/0438* (2013.01)

(58) Field of Classification Search
CPC ........... Y02E 60/10; Y02E 60/50; B61G 9/08; B61G 9/22; A01J 5/0175; B60R 19/18; B60R 19/34; B60R 19/24; B60R 2019/1813; B62D 21/152

See application file for complete search history.

(56) References Cited

U.S. PATENT DOCUMENTS

| | | | | |
|---|---|---|---|---|
| 4,471,992 A | * | 9/1984 | Matsuura ................ | B62D 25/04 296/203.03 |
| 4,826,238 A | * | 5/1989 | Misono .............. | B62D 25/2036 296/205 |
| 4,978,164 A | * | 12/1990 | Nakamura ............. | B62D 65/04 156/92 |
| 5,018,780 A | * | 5/1991 | Yoshii ................ | B62D 25/2027 296/30 |
| 5,921,618 A | * | 7/1999 | Mori ................... | B62D 25/2036 296/203.03 |
| 2018/0126933 A1 | * | 5/2018 | Kawase ................... | B60K 1/04 |
| 2018/0370570 A1 | * | 12/2018 | Ayukawa ........... | B62D 25/2018 |
| 2019/0359260 A1 | * | 11/2019 | Tsuyuzaki .......... | B62D 25/2036 |
| 2019/0382051 A1 | * | 12/2019 | Toyota ............... | B62D 25/2036 |
| 2020/0114973 A1 | * | 4/2020 | Takahashi .......... | B62D 25/2036 |
| 2020/0282816 A1 | * | 9/2020 | Matsuda .................. | B60K 1/04 |
| 2022/0032757 A1 | * | 2/2022 | An ............................ | B60K 1/04 |
| 2022/0111904 A1 | * | 4/2022 | Hwang ................ | B62D 21/157 |
| 2022/0144064 A1 | * | 5/2022 | Tatsuwaki ........... | H01M 50/202 |
| 2022/0185380 A1 | * | 6/2022 | An .............................. | B60J 5/06 |

\* cited by examiner

*Primary Examiner* — Kiran B Patel
(74) *Attorney, Agent, or Firm* — Slater Matsil, LLP

(57) ABSTRACT

A connection structure of an electric vehicle includes a cross member provided in a width direction of a vehicle body, a side member provided in a vehicle body length direction, and a joint member inserted into the cross member and connected to the side member. The joint member includes an insert portion inserted into the cross member, and a clamping portion connected to the side member.

20 Claims, 6 Drawing Sheets

CONNECTING STRUCTURE OF ELECTRIC VEHICLE

CROSS-REFERENCE TO RELATED APPLICATIONS

This application claims the benefit of Korean Patent Application No. 10-2020-0176167, filed in the Korean Intellectual Property Office on Dec. 16, 2020, which application is hereby incorporated herein by reference.

TECHNICAL FIELD

The present invention relates to a connection structure of an electric vehicle.

BACKGROUND

Recently, the Electric Vehicle (EV) market has grown rapidly and the demand for travel distance extension is increasing. In the early stages of EV development, a high voltage battery was positioned on the rear floor for common use with an existing internal combustion engine vehicle. However, the recently developed EV positions a high voltage battery with an increased size at the bottom of the center floor to extend the travel distance.

However, high voltage batteries have a risk of fire when damaged, and are particularly vulnerable in side collisions and pole collisions when positioned below the center floor. So, to protect the high voltage battery, it is necessary to minimize the deformation caused by collision in the vehicle body side seal structure.

In general EVs, aluminum reinforcement is applied inside the side sill to reinforce the side sill. The aluminum reinforcement is lightweight, has a low specific gravity, and has excellent impact absorption performance, but the side seal may bend due to excessive deformation during side impact. However, if reinforcement is applied excessively to prevent this, cost and weight may increase.

In addition, the torsion strength of the vehicle body may be deteriorated due to insufficient connectivity between the aluminum reinforcement and the sheet cross member provided in the vehicle width direction. Lack of torsional strength may deteriorate the Ride & Handling (R&H) performance of the vehicle and further affect the durability performance of the battery mounting area.

The above information disclosed in this Background section is only for enhancement of understanding of the background of the invention, and therefore it may contain information that does not form the prior art that is already known to a person of ordinary skill in the art.

SUMMARY

The present invention relates to a connection structure of an electric vehicle. Particular embodiments relate to a connection structure of an electric vehicle with improved energy absorption performance when a side impact occurs.

Embodiments of the present invention provide a connection structure of an electric vehicle that can more effectively protect a battery by improving energy absorption performance when a side collision occurs.

An exemplary embodiment of the present invention provides a connection structure of an electric vehicle that can increase the lateral strength of the vehicle body by improving the connectivity between members in the length direction and width direction of the vehicle body.

A connection structure of an electric vehicle according to an exemplary embodiment of the present invention may include a cross member provided in the width direction of a vehicle body, a side member provided in the vehicle body length direction, and a joint member inserted into the cross member and connected to the side member.

The joint member may include an insert portion inserted into the cross member, and a clamping portion connected to the side member.

The joint member may have a strength bead formed in the width direction of the vehicle body.

A strength rib may be formed inside the insert portion in the width direction of the vehicle body.

A connection hole for connection with the cross member may be formed in up and down directions in the insert portion.

A seat rail may be connected through the connection hole.

The side member may include an inner sill panel that is connected with the vehicle body, a panel hole may be formed in the inner sill panel, and the insert portion may be connected to the cross member through the panel hole.

The connection structure may further include a sealing member for sealing the panel hole.

The side member may include an inner sill panel connecting with the vehicle body, an outer sill panel connecting with the inner sill panel, and a side sill reinforcement inserted inside the inner sill panel and the outer sill panel, and the clamping portion may be connected to the side sill reinforcement.

The joint member and the side sill reinforcement may be made of aluminum material.

The joint member and the side seal reinforcement may be welded together.

The cross member may include a connection flange that is connected to the side member.

According to the connection structure of an electric vehicle according to an exemplary embodiment of the present invention, energy absorption performance is improved in the event of a side collision, so that the battery can be more effectively protected.

According to the connection structure of an electric vehicle according to an exemplary embodiment of the present invention, it is possible to increase the lateral strength of the vehicle body by improving the connectivity between members in the length direction and width direction of the vehicle body.

In addition, it is possible to suppress the transmission of vibration noise on the road surface by improving the side strength of the vehicle body.

According to the connection structure of an electric vehicle according to an exemplary embodiment of the present invention, the joint member serves as a seat mounting bracket, so that parts can be deleted and the connection strength with the seat can be increased.

In addition, effects that can be obtained or predicted by the embodiments of the present invention will be disclosed directly or implicitly in the detailed description of the embodiments of the present invention. That is, various effects predicted according to an embodiment of the present invention will be disclosed within a detailed description to be described later.

BRIEF DESCRIPTION OF THE DRAWINGS

These drawings are for reference only in describing exemplary embodiments of the present invention, and therefore, the technical idea of the present invention should not be limited to the accompanying drawings.

Figure 1:
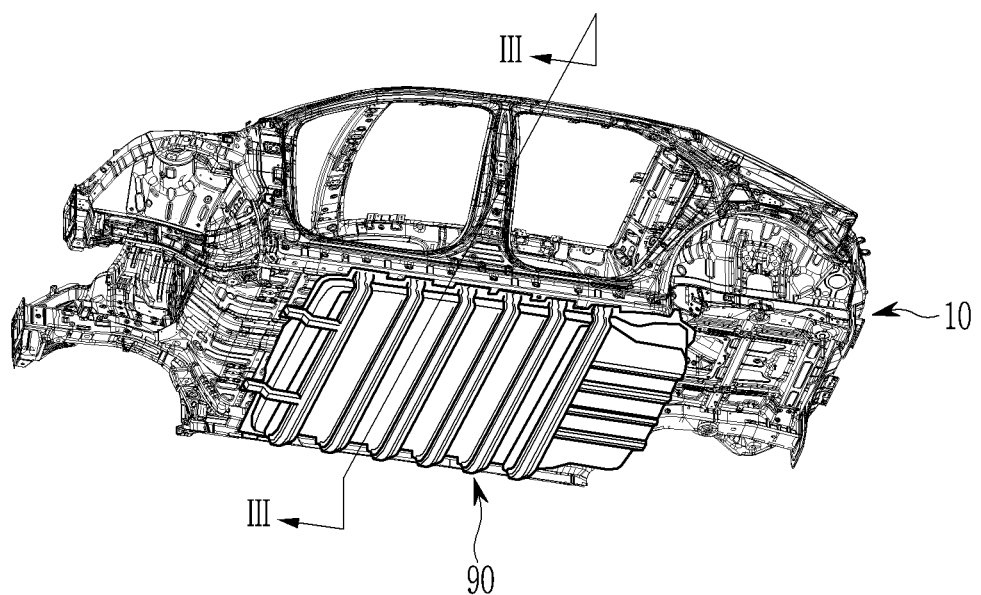
FIG. 1 is a perspective view showing a vehicle body to which a connection structure of an electric vehicle according to an exemplary embodiment of the present invention is applied.

The following elements are used to describe embodiments of the present invention.

| | |
|---|---|
| 10: vehicle body | 20: floor panel |
| 30: cross member | 32: connection portion |
| 34: connection flange | 40: side member |
| 42: inner sill panel | 44: panel hole |
| 46, 48: sealing member | 50: outer sill panel |
| 60: joint member | 62: insert portion |
| 64: strength rib | 66: connection hole |
| 68: clamping portion | 70, 71: strength bead |
| 80: side sill reinforcement | 90: battery case |
| 100: seat rail | 102: connection bolt |

DETAILED DESCRIPTION OF ILLUSTRATIVE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Parts indicated by the same reference numerals throughout the specification mean the same components.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless specifically stated to the contrary.

Exemplary embodiments of the present invention will hereinafter be described in detail with reference to the accompanying drawings.

Figure 2:
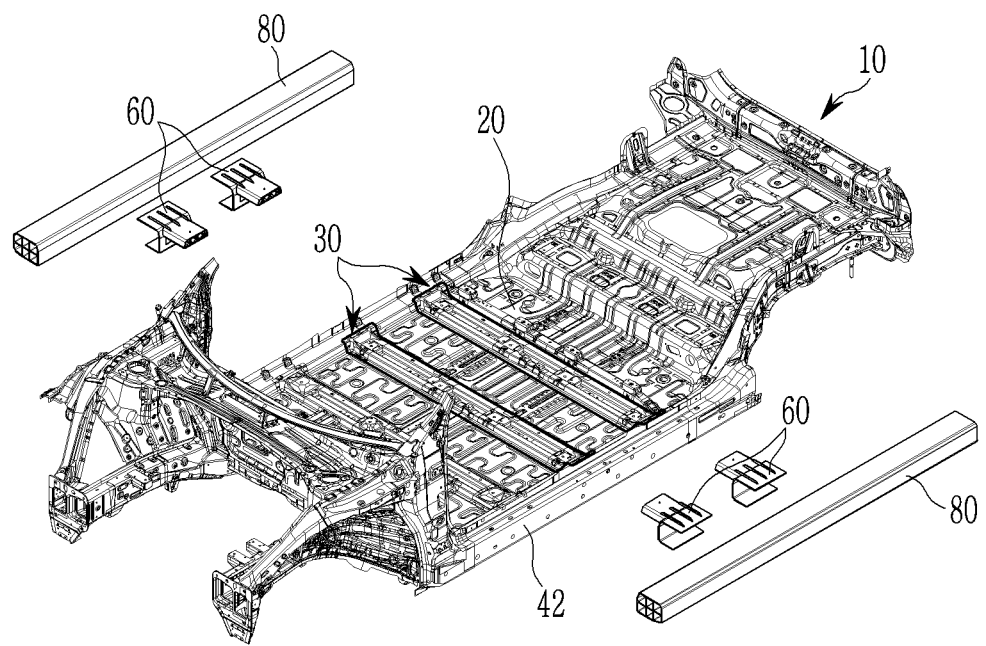
FIG. 2 is an exploded perspective view showing a partial disassembly of the connection structure of an electric vehicle according to an exemplary embodiment of the present invention.

FIG. 1 is a perspective view showing a vehicle body to which a connection structure of an electric vehicle according to an exemplary embodiment of the present invention is applied, and FIG. 2 is an exploded perspective view showing a partial disassembly of the connection structure of an electric vehicle according to an exemplary embodiment of the present invention.

Referring to FIG. 1 and FIG. 2, a connection structure of an electric vehicle according to an exemplary embodiment of the present invention may be applied to a vehicle in which a battery case 90 is mounted under a vehicle body 10, that is, under a floor panel 20.

Figure 3:
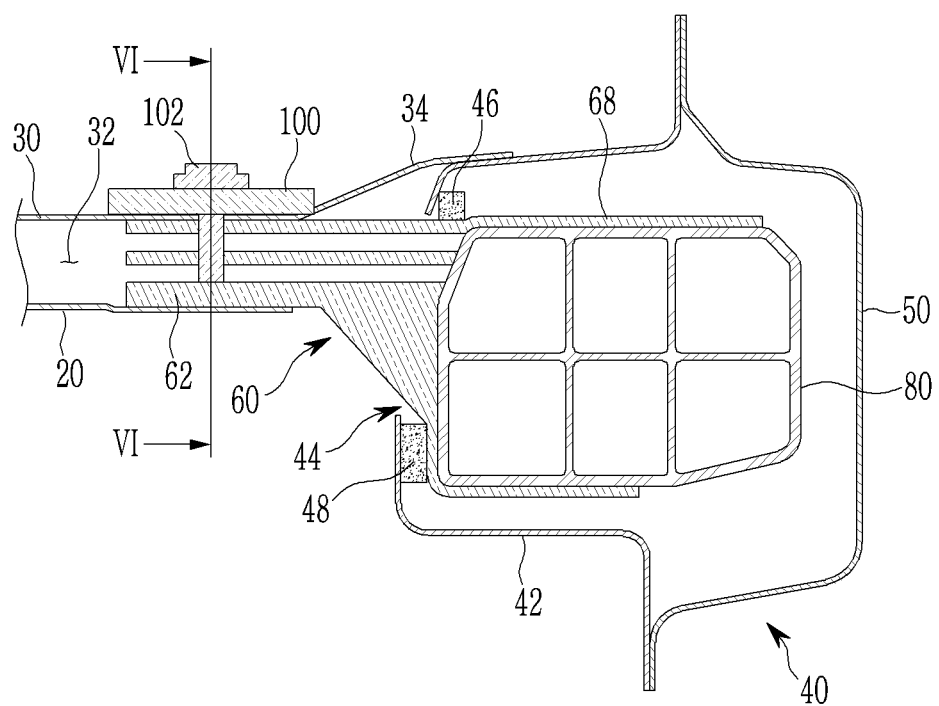
FIG. 3 is a cross-sectional view along line III-III of FIG. 1.

FIG. 3 is a cross-sectional view along line III-III of FIG. 1.

Referring to FIG. 1 to FIG. 3, the connection structure of an electric vehicle according to an exemplary embodiment of the present invention may include a cross member 30 provided in the width direction of the vehicle body 10, a side member 40 provided in the vehicle body length direction, and a joint member 60 inserted into the cross member 30 and connected to the side member 40.

The cross member 30 has a roughly "U" shape in its cross-section, and the floor panel 20 and the cross member 30 are connected to form a connection portion 32.

The joint member 60 can be inserted into the connection portion 32 to connect to the cross member 30. Therefore, the cross member 30 and the side member 40 are connected through the connection portion 32 to maintain connectivity, and it is possible to suppress the bending of the side member 40 in the event of a side collision of the vehicle.

Figure 4:
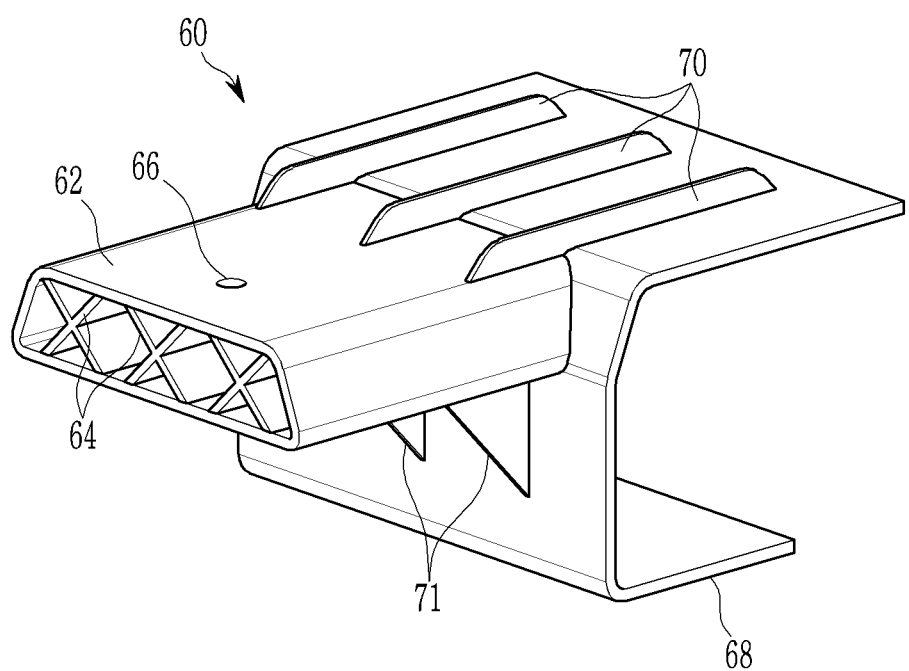
FIG. 4 is a perspective view of a joint member that can be applied to a connection structure of an electric vehicle according to an exemplary embodiment of the present invention.

FIG. 4 is a perspective view of a joint member that can be applied to a connection structure of an electric vehicle according to an exemplary embodiment of the present invention.

Referring to FIG. 3 and FIG. 4, the joint member 60 may include an insert portion 62 inserted into the cross member 30 and a clamping portion 68 connected to the side member 40.

The joint member 60 may have strength beads 70 and 71 formed in the width direction of the vehicle body 10. Therefore, even if an impact load is transmitted to the lateral direction of the vehicle body 10, bending of the side member 40 can be suppressed by the strength bead 70 and 71 of the joint member 60. The strength beads 70 and 71 may be formed in the width direction of the vehicle body 10 as shown in the drawing.

Inside the insert portion 62, a strength rib 64 formed in the width direction of the vehicle body 10 may be formed. Therefore, even if an impact load is transmitted to the lateral direction of the vehicle body 10, bending of the insert portion 62 can be suppressed by the strength rib 64 of the joint member 60. The strength rib 64 may be formed in the width direction of the vehicle body 10 as shown in the drawing.

In the insert portion 62, a connection hole 66 for connection with the cross member 30 may be formed in up and down directions. For example, a connection bolt 102 is engaged in the connection hole 66 so that the joint member 60 and the cross member 30 can be connected.

A seat rail 100 can also be connected through the connection hole 66. In other words, the seat rail 100 is disposed on the cross member 30 and the connection bolt 102 is engaged to connect the joint member 60, the cross member 30 and the seat rail 100, and thus, the assembly process may be simplified and the number of parts to engage may be reduced. In other words, the joint member 60 can serve as a mounting bracket to mount the seat rail 100, thereby increasing the connection strength with the seat.

Referring to FIG. 3, the side member 40 may include an inner sill panel 42 connected to the vehicle body 10 and an outer sill panel 50 connected to the inner sill panel 42.

A panel hole 44 is formed in the inner sill panel 42 so that the insert portion 62 can be connected to the cross member 30 through the panel hole 44. Therefore, the number of parts for connection between the side member 40 and the vehicle body 10 can be reduced, and the connection strength can be increased.

The connection structure of an electric vehicle according to an exemplary embodiment of the present invention may further include sealing members 46 and 48 for sealing the panel hole 44. The sealing members 46 and 48 may prevent foreign substances from penetrating into the side member 40.

The connection structure of an electric vehicle according to an exemplary embodiment of the present invention may further include a side sill reinforcement 80 inserted inside the inner sill panel 42 and the outer sill panel 50.

The clamping portion 68 can be connected to the side sill reinforcement 80. The side sill reinforcement 80 is inserted inside a "U" shape cross-section of the clamping portion 68 so that the clamping portion 68 and the side sill reinforcement 80 can be firmly connected.

The joint member 60 and the side sill reinforcement 80 can be formed of aluminum material. Therefore, it is possible to reduce the entire weight of the connection structure of an electric vehicle according to an exemplary embodiment of the present invention.

The joint member 60 and the side sill reinforcement 80 may be welded together. The joint member 60 and the side sill reinforcement 80 can be formed by aluminum extrusion and can be connected by welding, for example $CO_2$ welding.

Figure 5:
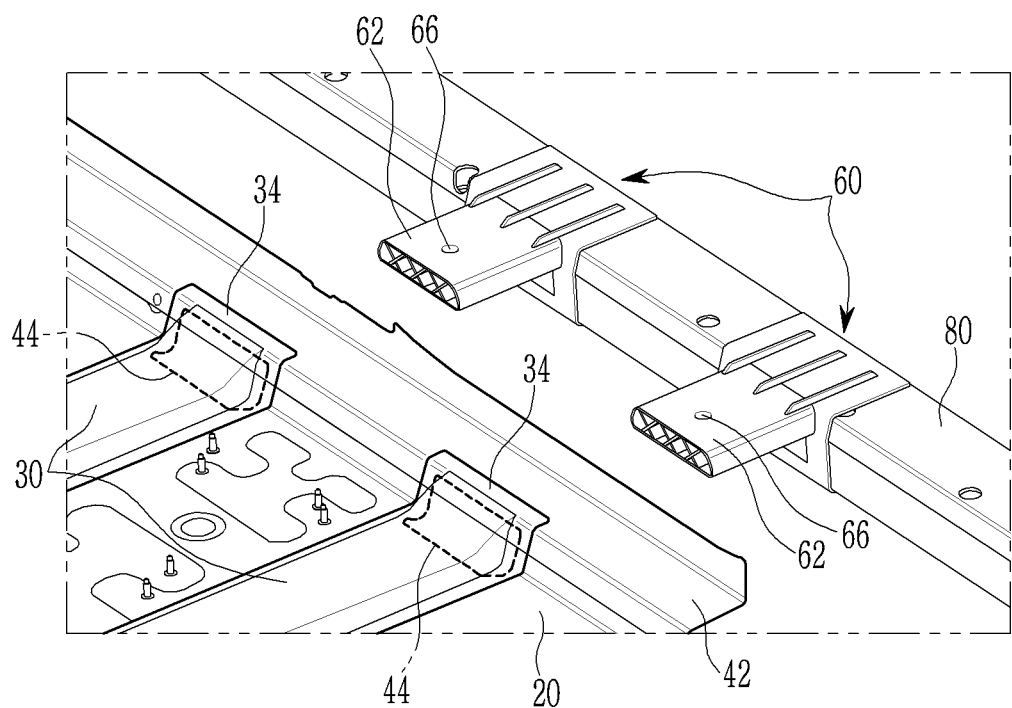
FIG. 5 is a drawing illustrating an assembly of a connection structure of an electric vehicle according to an exemplary embodiment of the present invention.

FIG. 5 is a drawing illustrating an assembly of a connection structure of an electric vehicle according to an exemplary embodiment of the present invention.

Referring to FIG. 5, the cross member 30 may include a connection flange 34 connected to the side member 40, and the connection flange 34 may be connected to the inner sill panel 42. For example, the cross member 30 and the inner sill panel 42 may be formed of a steel material, and when a side load of the vehicle occurs, for example, at a pole impact, the cross member 30 and the inner sill panel 42 can properly distribute the side load.

Figure 6:
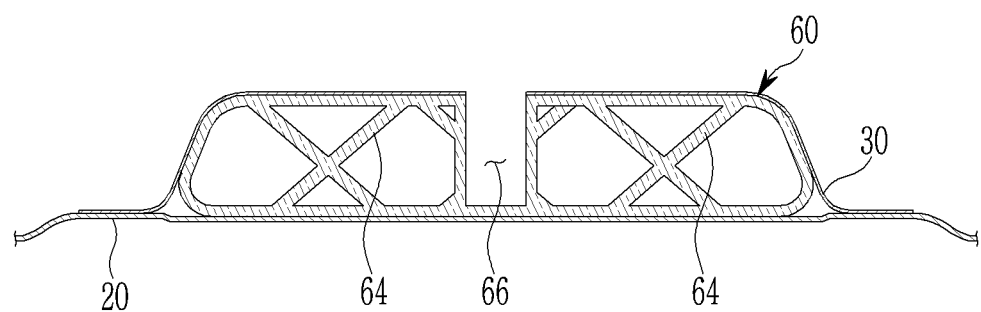
FIG. 6 is a partial cross-sectional view along the line VI-VI of FIG. 3.

FIG. 6 is a partial cross-sectional view along the line VI-VI of FIG. 3.

As shown in FIG. 6, as the space formed by the floor panel 20 and the cross member 30, the insert portion 62 is inserted and connected, so that the joint member 60 and the vehicle body 10 can be connected without a separate bracket.

The bending of the insert portion 62 can be suppressed by the strength rib 64 of the lattice pattern, thus preventing the battery case 90 from being damaged.

In addition, the cross member 30 can be connected through the connection hole 66, and additionally the seat rail 100 can be engaged, reducing the number of parts.

The joint member 60 connects the side sill reinforcement 80 in the length direction of the vehicle body 10 and the cross member 30 in the width direction of the vehicle body 10 without disconnection, which is advantageous in distributing the collision load.

The side sill reinforcement 80 and the joint member 60 can be firmly connected to secure an engaging integrity, and road noise transmission can be reduced.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A connection structure of an electric vehicle, the connection structure comprising:
   a cross member provided in a width direction of a vehicle body;
   a side member provided in a vehicle body length direction; and
   a joint member inserted into the cross member and connected to the side member.

2. The connection structure of claim 1, wherein the joint member comprises:
   an insert portion inserted into the cross member; and
   a clamping portion connected to the side member.

3. The connection structure of claim 2, wherein the joint member includes a strength bead formed in the width direction of the vehicle body.

4. The connection structure of claim 2, further comprising a strength rib formed inside the insert portion in the width direction of the vehicle body.

5. The connection structure of claim 2, further comprising a connection hole for connection with the cross member formed in up and down directions in the insert portion.

6. The connection structure of claim 5, further comprising a seat rail connected through the connection hole.

7. The connection structure of claim 2, wherein:
   the side member includes an inner sill panel configured to be connected with the vehicle body; and
   a panel hole is formed in the inner sill panel, and the insert portion is connected to the cross member through the panel hole.

8. The connection structure of claim 7, further comprising a sealing member configured to seal the panel hole.

9. The connection structure of claim 1, wherein the cross member comprises a connection flange connected to the side member.

10. A connection structure of an electric vehicle, the connection structure comprising:
    a cross member provided in a width direction of a vehicle body;
    a side member provided in a vehicle body length direction, wherein the side member comprises:
       an inner sill panel configured to connect with the vehicle body;
       an outer sill panel connecting with the inner sill panel; and
       a side sill reinforcement inserted inside the inner sill panel and the outer sill panel; and
    a joint member inserted into the cross member and connected to the side member, wherein the joint member comprises:
       an insert portion inserted into the cross member; and
       a clamping portion connected to the side member, wherein the clamping portion is connected to the side sill reinforcement.

11. The connection structure of claim 10, wherein the joint member and the side sill reinforcement comprise an aluminum material.

12. The connection structure of claim 11, wherein the joint member and the side sill reinforcement are welded together.

13. A vehicle comprising:
    a vehicle body including a floor panel;

a battery case mounted under the floor panel of the vehicle body;
a cross member provided in a width direction of the vehicle body;
a side member provided in a length direction of the vehicle body; and
a joint member comprising an insert portion inserted into the cross member and a clamping portion connected to the side member.

14. The vehicle of claim 13, wherein the joint member includes a strength bead formed in the width direction of the vehicle body.

15. The vehicle of claim 13, further comprising a strength rib formed inside the insert portion in the width direction of the vehicle body.

16. The vehicle of claim 13, further comprising a connection hole for connection with the cross member formed in up and down directions in the insert portion.

17. The vehicle of claim 16, further comprising a seat rail connected through the connection hole.

18. The vehicle of claim 13, wherein:
the side member includes an inner sill panel connected with the vehicle body; and
a panel hole is formed in the inner sill panel, and the insert portion is connected to the cross member through the panel hole.

19. The vehicle of claim 18, further comprising a sealing member configured to seal the panel hole.

20. The vehicle of claim 13, wherein the cross member comprises a connection flange connected to the side member.

* * * * *